(12) United States Patent
Czajkowski

(10) Patent No.: US 11,297,859 B2
(45) Date of Patent: Apr. 12, 2022

(54) VEGETABLE NOODLES AND METHODS FOR MAKING THE SAME

(71) Applicant: Lakeside Organics of Hadley, LLC, Hadley, MA (US)

(72) Inventor: Joseph J. Czajkowski, Hadley, MA (US)

(73) Assignee: Lakeside Organics of Hadley, LLC, Hadley, MA (US)

(*) Notice: Subject to any disclaimer, the term of this patent is extended or adjusted under 35 U.S.C. 154(b) by 0 days.

(21) Appl. No.: 17/320,560

(22) Filed: May 14, 2021

(65) Prior Publication Data

US 2021/0352942 A1   Nov. 18, 2021

Related U.S. Application Data

(60) Provisional application No. 63/024,819, filed on May 14, 2020.

(51) Int. Cl.
| | | |
|---|---|---|
| *A23L 19/00* | (2016.01) | |
| *A23B 7/157* | (2006.01) | |
| *A23B 7/024* | (2006.01) | |
| *A23B 7/005* | (2006.01) | |

(52) U.S. Cl.
CPC .............. *A23L 19/03* (2016.08); *A23B 7/005* (2013.01); *A23B 7/024* (2013.01); *A23B 7/157* (2013.01); *A23V 2002/00* (2013.01)

(58) Field of Classification Search
CPC ......... A23L 19/03; A23B 7/005; A23B 7/024; A23B 7/157; A23V 2002/00

USPC ......... 426/327, 323, 324, 615, 618; 425/106
See application file for complete search history.

(56) References Cited

U.S. PATENT DOCUMENTS

| | | | |
|---|---|---|---|
| 3,973,047 | A * | 8/1976 | Linaberry et al. |
| 6,777,016 | B2 | 8/2004 | Thresher |
| 2013/0274339 | A1 | 10/2013 | Lurya et al. |
| 2016/0021903 | A1 | 1/2016 | Dull et al. |
| 2018/0028189 | A1 | 2/2018 | Rago et al. |

FOREIGN PATENT DOCUMENTS

| | | |
|---|---|---|
| CN | 1344506 A | 4/2002 |
| CN | 102379399 B | 1/2013 |
| CN | 103523298 A | 1/2014 |

(Continued)

OTHER PUBLICATIONS

Bryan, L. Spiralizer Beginner's Guide: 2017, https://downshiftology.com/spiralizer-beginner's guide/, pp. 1-19. (Year: 2017).*

(Continued)

*Primary Examiner* — Helen F Heggestad
(74) *Attorney, Agent, or Firm* — Greenberg Traurig, LLP; David J. Dykeman

(57) ABSTRACT

The present disclosure features dried vegetable noodles having an increased shelf life and methods of making dehydrated vegetable noodles. The noodles are dry, shelf stable cut vegetable noodles (cut from whole produce, not extruded) and are lower in carbohydrate calories and higher in nutritional value than traditional grain-based noodles. The process results in a food safe, extended shelf stable singularized noodle that is nutritious, convenient and versatile.

7 Claims, 27 Drawing Sheets
(26 of 27 Drawing Sheet(s) Filed in Color)

(56) References Cited

FOREIGN PATENT DOCUMENTS

| | | |
|---|---|---|
| CN | 106333239 A | 1/2017 |
| WO | 2018166876 A1 | 9/2018 |

OTHER PUBLICATIONS

Guidance for Industry: "Guide to Minimize Microbial Food Safety Hazards of Fresh-cut Fruits and Vegetables"., pp. 1-30. 2008. (Year: 2008).*
Freeze Drying and rehydrating Crunchy Vegetables : https://harvestright.com/blog/2016/freeze-drying, pp. 1-11., 2016. (Year: 2016).*
Freeze drying cut vegetables ?—Bing. https://www.bing.com/search?q=Freeze+Drying+cut+vegetables%3F&src=IE-SearchBox&, pp. 1-4. , 2016. (Year: 2016).*
Mora, J. Does Freezing Really Kill Bacteria?, 2020, https://dailyhomesafety.com/does-freezing-Kill-bacteria/, pp. 1-13. (Year: 2020).*
Dodman, Vibratory Drying Conveyor, pp. 1-4, 2019, Dodman ltd, Hamburg Way, North Lyn Industrial Estate, King's Lynn, Norfolk, PE302nd. (Year: 2019).*
FDA, Washing Fruitsand Vegetables, excerpt of the 2013 FDA Food Code for provisions 3-3-2.15. pp. 1-5, 2013. . (Year: 2013).*
Monogram, Antimicrobial Fruit and Vegetable Treatment, pp. 1 and 2. www.monogramcleanforce.com. , 2018 (Year: 2018).*
"How to Preserve Zucchini Noodles" https://gardenmentors.com/garden-help/eat-drink-preserve/how-to-preserve-zucchini-noodles/.
"Make Your Own Dehydrated Zucchini Pasta" https://sluglines.blogspot.com/2014/10/make-your-own-dehydrated-zucchini-pasta.html.
"Dehydrating Zoodles and Squashetti" http://realfoodliving.com/recipes/main-dishes/dehydrating-zoodles-and-squashetti.
"Yumny Dried Vegetable Noodles 3 Pack—Spinach, Carrot, Pumpkin" Country of Origin—Malaysia https://www.ebay.com/itm/Yumny-Dried-Vegetable-Noodles-3-Pack/113811307410?hash=item1a7faebb92:m:m06ElmCS9352gUTW1ROuwiw.
"Yumny Spinach Instant Vegetable Noodles Travel Pack" https://www.ebay.com/itm/Yumny-Spinach-Instant-Vegetable-Noodles-Travel-Pack-with-Seasoning-3-Pack/113810769278?_trkparms=aid%3D1110001%26algo%3DSPLICE.SIM%26ao%3D2%26asc%3D20160323102634%26meid%3Dd481320feca24df6a9ef0327152fe195%26pid%3D100623%26rk%3D3%26rkt%3D6%26sd%3D113810768369%26itm%3D113810769278%26pmt%3D0%26noa%3D1%26pg%3D2047675%26algv%3DSimplAMLv5PairwiseWeb&_trksid=p2047675.c100623.m-1.
"Yumny Carrot Vegetable Noodles Instant Travel Pack" https://www.ebay.com/itm/113810768369.
YouTube Video, "HSN Kitchen Essentials featuring DASH Apr. 22, 2018—11 PM" by HSN; accessed at https://www.youtube.com/watch?v=GDN_IoPjk08&t=481s; available online Apr. 23, 2018 (Apr. 23, 2018); entire video especially between 7:30 and 7:50.
YouTube Video, "How to remove water vegetable dewatering machine, spin dryer" by Huafood-Vegetable Processing; accessed at https://www.youtube.com/watch?v=rHosEcGZ2U8; available online on Apr. 7, 2020 (Apr. 7, 2020) entire video especially 0:17 to 0:46.
PCT International Search Report in International Patent Application No. PCT/US2021/032528 dated Aug. 13, 2021.

* cited by examiner

VEGETABLE NOODLES AND METHODS FOR MAKING THE SAME

RELATED APPLICATIONS

This application claims priority to and the benefit of U.S. Application No. 63/024,819, filed May 14, 2020, the entire content of which is hereby incorporated by reference herein.

BACKGROUND

Grain-based noodles are high in carbohydrates, and such "empty starch" calories do not have high nutritional value. Furthermore, grain-based noodles contain gluten, which approximately 30% of consumers try to avoid due to dietary or health issues, such as celiac disease. Additionally, grain-based noodles are processed foods that are generally high in calories and contain relatively high levels of processed sugar, salt, and oil. Safe to eat natural substitutes for grain-based noodles are needed that are low in carbohydrates and calories, gluten-free, and have an extended shelf life similar to grain-based noodles.

SUMMARY

As described below, the presently disclosed embodiments feature dehydrated vegetable noodles and methods of making the same.

The presently disclosed embodiments provide methods for making vegetable noodles including contacting a vegetable with a solution containing a first antimicrobial agent, cutting the vegetable to form noodle shaped vegetable material, spinning the noodle shaped vegetable material, where the spinning removes excess liquid and moisture from the noodle shaped vegetable material, thereby forming a vegetable noodle. In some embodiments, the method also involves contacting the vegetable with a second antimicrobial agent. In some embodiments, the second antimicrobial agent is a different agent from the first antimicrobial agent. In some embodiments, the first or second antimicrobial agent comprises hypochlorite solution, ozone, hydrogen peroxide, peroxyacetic acid or combination thereof. In some embodiments, the first or second antimicrobial agent is selected from the group consisting of a hypochlorite solution, ozone, hydrogen peroxide, Oxidate® and Sanidate®. In some embodiments, the first antimicrobial agent is a hypochlorite solution. In some embodiments, the concentration of the first antimicrobial agent in the solution is between about 100 ppm and about 600 ppm. In some embodiments, the spinning is at about 400 rpm to about 1200 rpm. In some embodiments, the vegetable is one or more vegetable selected from zucchini, potato, sweet potato, spaghetti squash, summer squash, winter squash, butternut squash, parsnip, turnip or rutabaga, cucumber, carrot, bullseye beet, golden beet, red beet, celeriac, kohlrabi, pumpkin, eggplant, daikon, radish, mushroom, breadfruit, apple, durian, jack-fruit, mango, melon, papaya, and pineapple. In some embodiments, the method comprises incubating the vegetable noodle at a temperature sufficient to kill a microorganism. In some embodiments, the microorganism is a gram positive, a gram negative bacteria, mold, or yeast. In some embodiments, the microorganism belongs to the genus *Listeria, Escherichia, Salmonella, Campylobacter, Staphylococcus, Pseudomonas*, or *Lactobacillus*.

The presently disclosed embodiments provide methods for dehydrating vegetable noodles, including incubating a vegetable noodle at a first temperature sufficient to remove at least 86% of moisture from the noodle, and incubating the vegetable noodle at a second temperature sufficient to kill a microorganism. In some embodiments, between about 90% and at least 96% of the moisture is removed from the noodle. In some embodiments, the first temperature is between about 110° F. and about 130° F. In some embodiments, the noodle is incubated at the first temperature for between about 1 hour and about 4 hours. In some embodiments, the second temperature is between about 130° F. and about 160° F. In some embodiments, the method also involves singularizing the noodles. In some embodiments, the noodles are singularized on a conveyor belt assembly. In some embodiments, the microorganism is a gram positive, gram negative bacteria, mold, or yeast. In some embodiments, the microorganism belongs to the genus *Listeria, Escherichia, Salmonella, Campylobacter, Staphylococcus, Pseudomonas*, or *Lactobacillus*.

The presently disclosed embodiments provide methods of dehydrating vegetable noodles that involves lyophilizing the noodle and incubating the vegetable noodle at a temperature sufficient to kill a microorganism. In some embodiments, the temperature sufficient to kill a microorganism is between about 130° F. and about 160° F. In some embodiments, the microorganism is a gram positive, gram negative bacteria, mold, or yeast. In some embodiments, the microorganism belongs to the genus *Listeria, Escherichia, Salmonella, Campylobacter, Staphylococcus, Pseudomonas*, or *Lactobacillus*.

The presently disclosed embodiments provide methods of making a dehydrated vegetable noodle, including contacting a vegetable with a solution comprising a first antimicrobial agent, wherein the antimicrobial agent comprises hypochlorite solution, ozone, hydrogen peroxide, peroxyacetic acid or combination thereof; cutting the vegetable to form noodle shaped vegetable material; contacting the vegetable with a second antimicrobial agent, wherein the first and second antimicrobial agents are different; spinning the noodle shaped vegetable material, wherein the spinning removes excess liquid and moisture from the noodle shaped vegetable material, thereby forming a vegetable noodle; incubating a vegetable noodle at a first temperature sufficient to remove at least 86% of moisture from the noodle, wherein the first temperature is between about 110° F. and about 130° F.; incubating the vegetable noodle at a second temperature sufficient to kill a microorganism, wherein the second temperature is between about 130° F. and about 160° F.; and singularizing the noodles. In some embodiments, the first or second antimicrobial agent is selected from the group consisting of a hypochlorite solution, ozone, hydrogen peroxide, Oxidate® and Sanidate®.

The presently disclosed embodiments provide noodles made from the methods of any of the aforementioned aspects.

The presently disclosed embodiments provide compositions containing the noodles of the above aspect. In some embodiments, the composition also contains a flavor additive. In some embodiments, the composition also contains one or more preservatives. In some embodiments, the composition comprises one or more flavor additives, one or more preservatives, or a combination thereof.

Another aspect provides a kit containing the noodles or compositions of the presently disclosed embodiments, at least one flavor additive, and instructions for preparing a noodle recipe. In some embodiments, the kit containing the noodles or compositions comprises one or more flavor additives, one or more preservatives, or a combination thereof Other features and advantages of the presently disclosed embodiments will be apparent from the detailed description, and from the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

DETAILED DESCRIPTION

Figure 1:
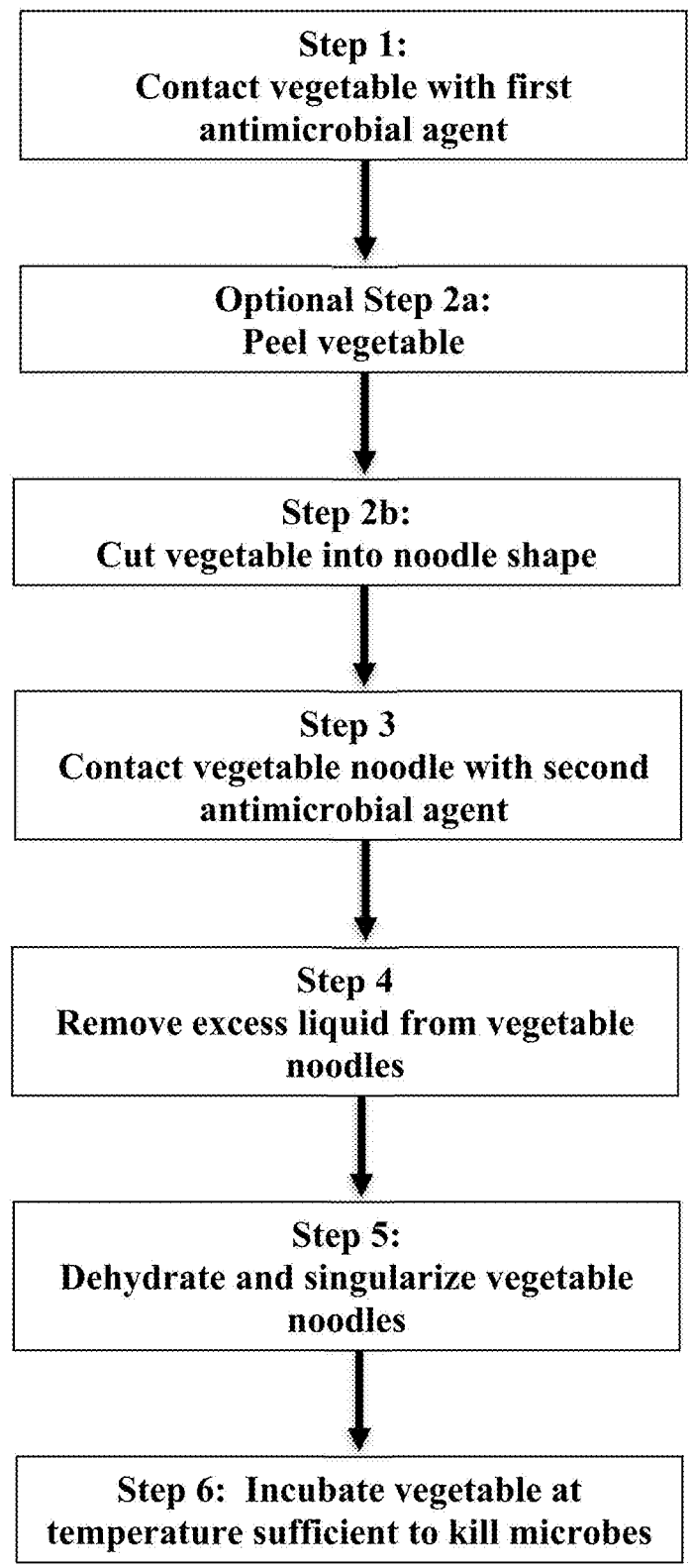
FIG. 1 is a flow chart showing a process for producing a dehydrated vegetable noodle, according to some embodiments.

The present disclosure features vegetable noodle and dehydrated vegetable noodle compositions and methods of making the same. The present disclosure features dried vegetable noodles having an increased shelf life and methods of making dehydrated vegetable noodles. According to aspects of the present disclosure, the noodles are dry, shelf stable cut vegetable noodles (cut from whole produce, not extruded) and are lower in carbohydrate calories and higher in nutritional value than traditional grain-based noodles. The process results in a food safe, extended shelf stable singularized noodle that is nutritious, convenient and versatile.

Definitions

Unless defined otherwise, all technical and scientific terms used herein have the meaning commonly understood by a person skilled in the art to which this presently disclosed embodiments belong. The following references provide one of skill with a general definition of many of the terms used in this application: Singleton et al., Dictionary of Microbiology and Molecular Biology (2nd ed. 1994); The Cambridge Dictionary of Science and Technology (Walker ed., 1988); The Glossary of Genetics, 5th Ed., R. Rieger et al. (eds.), Springer Verlag (1991); and Hale & Marham, The Harper Collins Dictionary of Biology (1991). As used herein, the following terms have the meanings ascribed to them below, unless specified otherwise.

By "agent" is meant any small molecule chemical compound, antibody, nucleic acid molecule, or polypeptide, or fragments thereof. An "antimicrobial agent" is any agent having antibacterial, antiviral, antifungal, antialgae, antipathogen or other activity that kills or reduces the number of microorganisms on a surface, in a sample, or otherwise present on an edible vegetable noodle.

In this disclosure, "comprises," "comprising," "containing" and "having" and the like can have the meaning ascribed to them in U.S. Patent law and can mean "includes," "including," and the like; "consisting essentially of" or "consists essentially" likewise has the meaning ascribed in U.S. Patent law and the term is open-ended, allowing for the presence of more than that which is recited so long as basic or novel characteristics of that which is recited is not changed by the presence of more than that which is recited, but excludes prior art embodiments.

By "conveyor belt assembly" is meant an apparatus or multiple apparatuses comprising at least one conveyor belt run (the length of a conveyor belt from where an object is placed on the conveyor belt until where it is removed from the conveyor belt). In some embodiments, a conveyor belt assembly comprises a first and second conveyor belt runs (a length of a conveyor belt), wherein the first conveyor belt run is configured to deposit its payload onto the second conveyor belt run. In some embodiments, a conveyor belt comprises at least one heating element.

By "dehydrate" is meant to remove moisture from a vegetable or vegetable noodle. A dehydrated vegetable or vegetable noodle can have greater than 50%, greater than 60%, getter than 70%, greater than 80%, greater than 90%, greater than 95%, greater than 96%, greater than 97%, greater than 98%, greater than 99% of its water content or moisture removed.

By "increase" is meant a positive alteration of at least 10%, 25%, 50%, 75%, or 100% or more.

As used herein, "obtaining" as in "obtaining an agent" includes synthesizing, purchasing, or otherwise acquiring the agent.

By "reduce" is meant a negative alteration of at least 10%, 25%, 50%, 75%, or 100%.

By "reference" is meant a standard or control condition.

By "singularize" or "singularizing" is meant a process by which noodles are physically separated. Singularizing noodles reduces aggregation of noodles (e.g., clumping or bird nests) that can negatively impact packaging or meal preparation. In some embodiments, singularizing refers to a process that separates between about 85% and 100% of the noodles. For example, singularizing noodles can separate about 85%, 86%, 87%, 88%, 89%, 90%, 91%, 92%, 93%, 94%, 95%, 96%, 97%, 98%, 99%, or even 100%.

"Vegetable" as used herein refers to any plant or plant part that can be used in producing a noodle. Fruits, vegetables, and tubers are considered vegetables for the purposes of this disclosure. Examples of vegetables, for the purposes of this disclosure include, but are not limited to zucchini, potato, sweet potato, squash (e.g., spaghetti, summer, winter, and butternut), broccoli or cauliflower (e.g., stems), parsnip, turnip or rutabaga, cucumber, carrot, beet (e.g., red beet, bullseye and golden), celeriac, kohlrabi, pumpkin, daikon, radish, eggplant, mushrooms, breadfruit, apple, durian, jack-fruit, mango, melon, papaya, and pineapple.

Ranges provided herein are understood to be shorthand for all of the values within the range. For example, a range of 1 to 50 is understood to include any number, combination of numbers, or sub-range from the group consisting 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, or 50.

Unless specifically stated or obvious from context, as used herein, the term "or" is understood to be inclusive. Unless specifically stated or obvious from context, as used herein, the terms "a," "an," and "the" are understood to be singular or plural.

Unless specifically stated or obvious from context, as used herein, the term "about" is understood as within a range of normal tolerance in the art, for example, within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from context, all numerical values provided herein are modified by the term "about".

The recitation of an embodiment for a variable or aspect herein includes that embodiment as any single embodiment or in combination with any other embodiments or portions thereof.

Any compositions or methods provided herein can be combined with one or more of any of the other compositions and methods provided herein.

Vegetable Noodles

A "vegetable noodle" as used herein, is a noodle produced by cutting a vegetable into a noodle shape, wherein the final noodle product comprises greater than 50% vegetable matter. In some embodiments, a vegetable comprises at least 60%, at least 70%, at least 80%, at least 90%, at least 95%, or even 100% vegetable matter. In some embodiments of the present disclosure, a vegetable noodle comprises vegetable matter such as but not limited to zucchini, potato, sweet potato, squash (e.g., spaghetti, summer, winter, and butternut), broccoli or cauliflower (e.g., stems), parsnip, turnip or rutabaga, cucumber, carrot, beet (e.g., red beet, bullseye beet and golden beet), celeriac, kohlrabi, pumpkin, daikon, radish, mushrooms, breadfruit, apple, durian, jack-fruit, mango, melon, papaya, and pineapple. In some embodiments, the vegetable are organic vegetables (e.g. Organic Certified by USDA). The vegetable noodle may comprise the skin of the vegetable, the flesh of the vegetable, or both. For example, the vegetable (e.g., butternut squash) may be peeled prior to being cut into a noodle, thereby resulting in a vegetable noodle comprising only the flesh of the vegetable. In contrast, some embodiments of zucchini noodles, for example, include the peel, or skin, of the vegetable along with the flesh.

Vegetables that can be used to make the noodles described herein have different properties that result in noodles having different appearances, nutritional and flavor profiles, and texts. For example, carrots are unique in that they have a cuticle cell wall, and noodles made from carrots will therefore take longer to cook and soften. Carrot noodles can maintain a harder texture relative to other vegetable noodles and are less likely to become mushy. Carrot noodles are flavorful and surprisingly can provide much of the flavor in soups, especially chicken noodle soup.

The noodles herein can be made from parts of vegetable that are often discarded, thereby decreasing agriculture and food waste. For example, the florets of broccoli are the most valuable portion of a broccoli crown, and are typically separated from the less expensive stem portion during process. The stem portion is often discarded, but because they can be used to make a vegetable noodle using the methods provided herein, the stems represent an inexpensive by-product of broccoli crowns. In some embodiments, the flavor profile of broccoli noodles make them well-suited to be combined with other noodles.

Radish and daikon vegetables have a spectrum of flavor profiles, with some being sweet, others sour, some with sharp flavors, while others are mild. A daikon radish can be 4 inches in girth and three feet long and has a tangy flavor. Daikon radishes are white and appear similar to, and can be used in the same way as, a traditional grain-based noodle.

There are also many types of beets that are suitable for being used in noodle production. Golden, yellow and white beets are very nutritious and people concerned with eating healthy have a renewed interest in these vegetables. Beet noodles can be used in soup to add color as well as flavor. In some embodiments, beet noodles are consumed uncooked, perhaps as a substitute for grain-based snacks. Additionally, red, chioggia, and target beets have alternating color rings, and make very attractive noodles.

Turnips are another nutritious vegetable that can be used to make noodles. Turnips are unique in that they do not brown or discolor when exposed to the air (e.g., after cutting) like some other white vegetables do. Additionally, these vegetables look very similar to traditional grain-based noodles and can be used as a substitute. Rutabagas are slightly yellow but are also very stable when cut.

Mushroom noodles can also be prepared using the methods provided herein. These mushrooms have wide flavor and color profiles due to the hundreds of different types of mushrooms that can be used. Mushroom noodles are shelf stable when dried. Mushroom noodles even have medicinal benefits with certain varieties (e.g., lower cholesterol, etc.).

The vegetable noodles described herein are cut directly from a vegetable into a noodle shape and are not homogenized or extruded. Thus, in some embodiments, the vegetable noodles do not comprise high-carbohydrate additives such as flour, which can be necessary when making an extruded noodle. Therefore, vegetable noodles described herein have increased nutritional value and an increased vegetable material-to-calorie ratio relative to flour-containing extruded noodles, including grain-based noodles. For example, the vegetable noodle have increased nutritional value such as dietary fiber, vitamins, minerals or combinations thereof. The vegetable noodles are natural substitutes for grain-based noodles that are low in carbohydrates and calories, gluten-free, and have an extended shelf life similar to grain-based noodles. In some embodiments, the vegetable noodles are cholesterol free.

The noodles can be any type of pasta noodle and have any shape including, but not limited to, decorative, small, stuffed, tubular, twisted, long, and/or sheet noodles. Examples of decorative noodles including, but not limited to, Alfabeto, Fiori, Orecchiette, Conchiglie, Farfalle, and stelline. Examples of small noodles include, but not limited to, Anelli, Ditalini, and Orzo. Examples of stuffed noodles include, but not limited to, Cannelloni, Caramelle, Ravioli, Agnolotti, and Tortellini. Examples of tubular noodles include, but not limited to, Anelli, Penne, Rigatoni, Calamarata, Ziti, Macaroni, and Tufoli. Examples of twisted noodles include, but not limited to, Campanelle, Fusilli, Gemelli, Rotini, and Trofie. Examples of long noodles include, but not limited to, Bucati, Capellini, Linguine, Fettuccine, Pizzoccheri, Reginette, Pappardelle, Spaghetti, Tagliatelle, and Vermicelli. Examples of sheet noodles include, but not limited to, lasagna. In some embodiments, the noodles can have star (stelline), diamond, lightning bolt, planet, animal or other shapes, including other stamped shapes. Other example of noodles include but are not limited to mafalde, ramen, wanton, udon, instant noodles and fideo.

In addition, the presently disclosed embodiments can be used to make near neighbors of noodles including, but not limited to, gnocchi, gnudi and similar items.

In some embodiments, the noodles are in the form of a ramen noodle product. As the process does not involve frying and is performed in the absence of oil, the noodle product is healthy, low fat and low calorie. In some embodiments, the noodles can be packaged as bricks, biscuits, pucks, cake or the like.

The vegetable noodle of the present disclosure may be a fresh noodle or a dehydrated noodle. Fresh noodles are intended to be consumed within days or weeks post-production, whereas the dehydrated vegetable noodles have a shelf life of 6 months or longer. In some embodiments, the shelf life is between 6 months and 1 year, 6 months and 2 years, 6 months and 3 years, between 1 and 3 years or longer. The shelf life of the vegetable noodles can be comparable that the shelf life of grain-based noodles. The dehydrated vegetable noodles are therefore suitable for long-distance shipping and long-term storage. Both of these properties increase the availability of these nutritious vegetable noodles to individuals relative to fresh vegetable noodles.

The increased shelf life and availability of the dehydrated vegetable noodles are comparable to traditional extruded grain-based noodles but are advantageous because of the increased nutritional value of the vegetable noodles. The same is true when comparing the presently described vegetable noodle and vegetable noodles prepared by extrusion means. While the extrusion-prepared vegetable noodles contain vegetable matter, the weight percentage of that vegetable matter is many fold less than the weight percentage of vegetable matter in the presently described vegetable noodles. In some embodiments, the vegetable noodles do not contain flour (such as grain-based flour), as typically found in extrusion vegetable noodles. In some embodiments, the presently described vegetable noodles do not contain wheat flour. In some embodiments, the presently described vegetable noodles do not contain legume flour (e.g. soy flour, pea flour, lentil flour or the like). In some embodiments, the only ingredient in the vegetable noodle is the vegetable material. According to aspects of the disclosure, the vegetable noodle described herein are wheat free. According to aspects of the disclosure, the vegetable noodle described herein are gluten free. Thus, the presently described vegetable noodle can be used to meet an individual's nutritional needs. For example, the presently described vegetable noodle can be consumed by individuals having gluten allergy or sensitivity. In some embodiments, the presently described vegetable noodle can be consumed by individuals in and around food deserts. A food desert is defined as a geographical region in which it is difficult to purchase nutritious foods, such as fresh fruits and vegetables. The increased shelf life of the dehydrated vegetable noodle described herein allows food suppliers to stock more vegetable material, thereby providing access to a nutritious substitute for high-carbohydrate grain-based noodles.

The vegetable noodles described herein have a shelf life of at least 6 months, at least 1 year, at least 2 years or more. In some embodiments, the color, texture, integrity, and flavor is not reduced by storage. Storage can be for example, in an inert atmosphere, in a packaging that minimize light contact, in a packaging that minimize oxygen contact, in a packaging that minimize humidity or any of the forgoing.

Compositions Comprising Vegetable Noodles

Compositions are contemplated herein that comprise the vegetable noodle described above and one or more food additive. For example, preservatives, vitamins and minerals, and flavor additives are routinely used to increase the shelf life of a food product, increase its nutritional value, and modify its flavor, respectively. A composition comprising the vegetable noodle of the present disclosure can also comprise a natural food additive, such as a spice or herb. The spice or herb or salt increases the shelf life in some embodiments. In some embodiments, the herb can include for example, garlic, celery seed, basil, oregano, marjoram, mustard seed, parsley, sage, basil, tarragon, rosemary and the like. In some embodiments, the food additive is an artificial ingredient. In some embodiments, the vegetable noodle does not contain any artificial ingredients.

In some embodiments, the vegetable noodles are treated with a food grade preservative or other additive. For example, the vegetable noodle may be treated with salt, which can aid in the dehydration process as well as augment the flavor of the noodle. In some embodiments, the noodles are treated with a coloring agent. In some embodiments, the preservative, coloring agent or other additive is a naturally occurring compound or agent. In some embodiments, the preservative coloring agent or other additive is an artificial (i.e., not natural) compound or agent. In some embodiments, the noodles are treated with a natural anti-oxidant or synthetic anti-oxidant. In some embodiments, the noodles are treated with a natural or synthetic anti-browning agent. When vegetables are cut, oxygen exposure can result in enzymatic browning of the vegetables. In some embodiments, an antioxidant such as ascorbic acid (vitamin C), iso-ascorbic acid, citric acid or combinations thereof can be added to prevent or reduce browning. In some embodiments, citric acid, lemon or orange juice, pineapple juice, natural or synthetic ascorbic acid, honey, calcium chloride or combinations thereof can be added to the noodles. In some embodiments, the anti-browning agent can be applied to the cut vegetable by wetting, immersing, spraying or any method known in the art. In some embodiments, the application can be under pressure or under vacuum.

In some embodiments, the vegetable noodles are not treated with a food grade preservative or other additive. In some embodiments, the only ingredient in the vegetable noodle is the vegetable material.

In some embodiments, the vegetables in the vegetable noodles are organic vegetables. In some embodiments, the vegetable noodles comprise organic vegetables to make products that are organic certifiable under USDA requirements for food labeling.

In some embodiments of the present disclosure, the composition comprising a vegetable noodle has an increased ratio of vegetable material to food additive relative to commercially available noodles. For example, in some embodiments of the present disclosure, the composition comprising a vegetable noodle has a ratio of vegetable noodle to food additive of between about 10:1 and about 20:1, between about 20:1 and about 30:1, between about 30:1 and about 40:1, between about 40:1 and about 50:1, between about 50:1 and about 60:1, between about 60:1 and 70:1, between about 70:1 and 80:1, between about 80:1 and 90:1, between about 90:1 and 100:1, or even between about 100:1 or greater. The percentage of vegetable material in the composition comprising the vegetable noodle is, in some embodiments, between about 80% and 85%, between about 85% and 90%, between about 90% and 95%, or between about 95% and about 100%. The percentage of vegetable material in the composition comprising the vegetable noodle is, in some embodiments, 80%, 81%, 82%, 83%, 84%, 85%, 86%, 87%, 88%, 89%, 90%, 91%, 92%, 93%, 94%, 95%, 96%, 97%, 98%, 99% or 100%. In some embodiments, the vegetable noodle comprises only vegetable material. In some embodiments, the vegetable noodles described herein do not contain a coloring agent. In some embodiments, the vegetable noodles described herein do not contain a preservative.

Process for Making Vegetable Noodles

The vegetable noodles described above are made using a novel process that results in noodles that are safer to eat and less likely to adhere to other noodles (FIG. 1). Harvested vegetables, without proper processing, may be contaminated with microbes including, but not limited to, gram positive and gram negative bacteria, mold and yeast. Common microbial contaminants of vegetables include, but are not limited to, *Listeria* species (e.g., *Listeria monocytogenes*, *Escherichia coli* (e.g., *E. Coli* O157-H7), *Salmonella*, acidophilic thermophilic bacteria, *campylobacter*, mold and yeast, *Staphylococcus* (e.g., *Staphylococcus aureus*), *Pseudomonas aeruginosa*, and *Lactobacillus* (e.g., *Lactobacillus malefermentans*). In some embodiments, to ensure the safety of the noodles, the vegetable material is exposed to at least one antimicrobial treatment to decrease or eliminate microbial contamination (step 1, FIG. 1). For example, harvested vegetables can be initially treated with an antimicrobial composition or antimicrobial agent prior to peeling and/or prior to cutting. In some embodiments, the antimicrobial agent acts by surface contact with the vegetable being treated. In some embodiments, the contacting step comprises wetting, immersing, spraying the vegetable to be treated. In some embodiments, the treatment with the antimicrobial agent(s) can be done under pressure. In some embodiments, the initial treatment can include contacting the vegetable with a hypochlorite solution (e.g., bleach, sodium hypochlorite, chlorine dioxide), ozone, hydrogen peroxide, peroxyacetic acid, or other antimicrobial agent or composition or combination thereof. In some embodiments, the vegetable can be contacted with from about 100 ppm and about 600 ppm, 200 ppm and about 600 ppm, 300 ppm and about 600 ppm, 400 ppm and about 600 ppm, 500 ppm and about 600 ppm, 100 ppm and about 200 ppm, 100 ppm and about 300 ppm, 100 ppm and about 400 ppm, 100 ppm and about 500 ppm, 200 ppm and about 300 ppm, 200 ppm and about 400 ppm, 200 ppm and about 500 ppm, 300 ppm and about 400 ppm, 300 ppm and about 500 ppm, 400 ppm and about 500 ppm of antimicrobial agent or composition. In some embodiment, the vegetable can be contacted with from about 100 ppm, 150 ppm, 175 ppm 200 ppm, 250 ppm, 300 ppm, 350 ppm, 400 ppm, 450 ppm, 500 ppm, 550 ppm, 600 ppm of antimicrobial agent or composition. For example the vegetable can be contacted with from 175 ppm to about 200 ppm chlorine solution. In some embodiments, the antimicrobial composition is a combination of hydrogen peroxide and peroxyacetic acid. Commercially available antimicrobial composition include, but are not limited to, Oxidate® and Sanidate®. The initial antimicrobial treatment results in a substantial decrease in the amount of microbial contamination. For example, the microbial contamination may be decreased by between about 90% and about 95%, between 95% and about 99%, or by even more than about 99%. Optionally the vegetable can be rinsed with water to remove the antimicrobial agent and/or dried. In some embodiments, the vegetable can be treated by irradiation to reduce or eliminate microorganisms, fungus and/or insects. In some embodiments, the vegetable can be subjected to gamma radiation, X-rays, electron beam or combinations thereof. In some embodiments, the vegetables can be treated with an antimicrobial agent and by irradiation.

After the initial antimicrobial treatment, the vegetable is peeled in some embodiments (Step 2a, FIG. 1) and cut (Step 2b, FIG. 1) into the desired shape. In other embodiments, the skin of the vegetable is not peeled. Vegetables such as certain squashes have a peel or skin that is not typically consumed or has a texture that is not compatible with a noodle. If peeled, the vegetable flesh may be subjected to another antimicrobial treatment; however, bleach solutions and other harsh chemical treatments are not typically used. The vegetable can be subjected to the second antimicrobial agent before or after being cut. In some embodiments, the method for producing the vegetable includes an acidifying step to kill microbes, in which the vegetable is contacted with a second antimicrobial agent that lowers pH (Step 3, FIG. 1). In some embodiments, the antimicrobial agent acts by surface contact with the vegetable being treated. In some embodiments, the contacting step comprises wetting, immersing, spraying the vegetable to be treated. For example, an acidic solution can be applied to the noodles to kill bacteria that are susceptible to a lower pH. As a product's pH is lowered, the amount of an organic acid in its undissociated form increases. The undissociated forms have the greatest ability to keep microbial growth under control. Some organic acids such as benzoic and sorbic acids are extremely effective microbial inhibitors and are considered "preservatives." Optionally the vegetable can be rinsed with water to remove the antimicrobial agent. In some embodiments, the acidic solution can be any acidic composition that does not negatively impact the flavor or food safety of the noodle or that after removal (i.e., post-wash) does not negatively impact the flavor or food safety of the noodle. In some embodiments, the acidifying solution comprises lemon juice or a vitamin C (ascorbic acid) solution. In some embodiments, the acidifying solution comprises one or more of lactic acid (sodium lactate), acetic acid, sodium diacetate, glucono-delta-lactone (GDL), sodium acid sulphate, or phosphoric acid.

When using an acidifying step, the pH of the solution is between about pH 2 and about pH 6, between about pH 3 and about pH 6, between about pH 4 and about pH 6, or between about pH 5 and about pH 6. In some embodiments, the pH of the acidifying solution is between about pH 2 and about pH 5, between about pH 2 and about pH 4, or between about pH 2 and about pH 3. In some embodiments, the pH of the acidifying solution is between about pH 4 and about pH 5.

The vegetable (peeled or unpeeled) is precisely cut to reduce cellular damage at the termini or edges of the noodle relative to an improper cut. An "improper cut" as used herein causes extensive cellular damage that results in increased release of starches from the noodles. The increased starch on the exterior of the noodle increases the adhesiveness of the noodle and its propensity to bind to other noodles. Aggregation of noodles impairs downstream processing (i.e., drying and packaging), thereby decreasing the efficiency of noodle production and increasing the costs associated with processing the noodles.

In some embodiments, the method for producing the vegetable noodle further comprises a heat step to kill microbes (e.g., bacteria, fungus (e.g., mold and yeast), and other microbial contaminants) (FIG. 1). In some embodiments, the heat step involves incubating the noodle between about 145° F. and about 160° F. In some embodiments, the heat step is between about 145° F. and 150° F., between about 150° F. and about 155° F., or between about 155° F. and 160° F. For example, the heat step can be at a temperature of about 145° F., 146° F., 147° F., 148° F., 149° F., 150° F., 151° F., 152° F., 153° F., 154° F., 155° F., 156° F., 157° F., 159° F. or 160° F. The noodles are incubated at the temperature sufficient to kill a microbe for at least 10, 20, 30, or even 45 minutes. In some embodiments, the noodles are incubated between 5 and 45 minutes, between 5 and 40 minutes, between 5 and 30 minutes, between 5 and 20 minutes, between 10 and 45 minutes, between 10 and 40 minutes, between 10 and 30 minutes, or between 10 and 20 minutes.

The methods disclosed herein can include multiple steps for reducing or eliminating microbial contaminants. In some embodiments where more than one (e.g. two, three or more) anti-microbial step is included, the steps include different means of reducing or eliminating microbial contamination. For example, a first step for reducing or eliminating anti-microbial contamination can include contacting the vegetable, vegetable material, or vegetable noodle with a bleach or other chlorine solution, while a subsequent step includes contacting the vegetable, vegetable material, or vegetable noodle with an acidifying agent (e.g., lemon juice). In some embodiments of the methods provided, an antimicrobial chemical agent (e.g., a chlorine solution, lemon juice, and the like) is used with a heat treatment simultaneously. In some embodiments, the heat treatment is applied at a different time than the chemical application, for example before or after the acidifying or antimicrobial chemical agent application. Employing different antimicrobial chemistries can improve the antimicrobial effectiveness of the method, as certain microbes may escape treatments with certain agents but not others.

The noodles, in some embodiments, are centrifuged or otherwise spun to remove excess liquids (Step 4, FIG. 1). The removed liquid can comprise starches or other adhesives that can cause binding of noodles that result in clumping or bird nests. Thus, spun noodles are less prone to binding other noodles. Removal of the liquid also can increase the shelf life of the noodles. Thus, in some embodiments, the noodles are spun at between about 400 rpm to about 2000 rpm, about 500 rpm to about 2000 rpm, about 600 rpm to about 2000 rpm, about 700 rpm to about 2000 rpm, about 800 rpm to about 2000 rpm, about 900 rpm to about 2000 rpm, about 1000 rpm to about 2000 rpm, about 1100 rpm to about 2000 rpm, about 1200 rpm to about 2000 rpm, about 1300 rpm to about 2000 rpm, about 1400 rpm to about 2000 rpm, from about 1500 rpm to about 2000 rpm, from about 1600 rpm to about 2000 rpm, from about 1700 rpm to about 2000 rpm, from about 1800 rpm to about 2000 rpm, or from about 1900 rpm to about 2000 rpm. In some embodiments, the noodles are spun at between about 400 rpm and about 1900 rpm, about 400 rpm and about 1800 rpm, about 400 rpm and about 1700 rpm, about 400 rpm and about 1600 rpm, about 400 rpm and about 1500 rpm, about 400 rpm and about 1400 rpm, about 400 rpm and about 1300 rpm, about 400 rpm and about 1200 rpm, about 400 rpm and about 1100 rpm, about 400 rpm and about 1000 rpm, about 400 rpm and about 900 rpm, about 400 rpm and about 800 rpm, about 400 rpm and about 700 rpm, about 400 rpm and about 600 rpm, or about 400 rpm and about 500 rpm. In some embodiments, the noodles are spun at about 600 rpm to about 1000 rpm. In some embodiments, the noodles are spun at 600 rpm, 700 rpm, 800 rpm, 900 rpm, or 1000 rpm. In some embodiments, the noodles are spun for between about 30 seconds and 10 minutes. In some embodiments, the noodles are spun for between about 30 seconds and about 10 minutes, about 1 minute and about 10 minutes, about 2 minutes and about 10 minutes, about 3 minutes and about 10 minutes, about 4 minutes and about 10 minutes, about 5 minutes and about 10 minutes, about 6 minutes and about 10 minutes, about 7 minutes and about 10 minutes, about 8 minutes and about 10 minutes, or about 9 minutes and about 10 minutes. In some embodiments, the noodles are spun for between about 30 seconds and about 9 minutes, about 30 seconds and about 8 minutes, about 30 seconds and about 7 minutes, about 30 seconds and about 6 minutes, about 30 seconds and about 5 minutes, about 30 seconds and about 4 minutes, about 30 seconds and about 3 minutes, about 30 seconds and about 2 minutes, or about 30 seconds and about 1 minute. In some embodiments, the noodles are spun for 30 seconds, 1 minute, 1.5 minutes, 2 minutes, 2.5 minutes, 3 minutes, 4 minutes, 5 minutes, 6 minutes, 7 minutes, 8 minutes, 9 minutes, or 10 minutes or more. In some embodiments, the noodles are spun at about 35° F., about 36° F., about 37° F., or about 38° F.

Certain vegetables are processed differently. Zucchini, for example, is 96% moisture and requires a longer spin cycle. In some embodiments, butternut squash, sweet potatoes, and beets, cut well and will dry sufficiently under similar conditions. Carrots cut differently compared to other vegetables, due to the different cellular structure of carrots. A carrot has a cuticle cell wall that is harder and takes longer to dry. Additionally, vegetables can be processed together to produce a mix of vegetable noodles. These mixtures can possess more nutritional value than a single type of vegetable noodle, along with different flavor and texture profiles.

Process for Dehydrating Vegetable Noodles

A vegetable noodle can be dehydrated, thereby removing moisture content that may hasten decomposition and shorten the shelf life of the noodle (Step 5, FIG. 1). Methods for dehydrating are known in the art. For example, desiccation under pressure and/or with the aid of a desiccant can be used to dehydrate vegetable noodles. In some embodiments, vegetable noodles are dehydrated by lyophilization. In other embodiments, vegetable noodles are dehydrated by freeze drying in high vacuum. In other embodiments, vegetable noodles are dehydrated by microwave freeze drying. In other embodiments, vegetable noodles are dehydrated by heating the noodles. In still other embodiments, the vegetable noodles are dehydrated by belt drying. Belt drying involves placing noodles on a conveyor belt assembly and exposing the noodles to an air current or heat or both. The belt can be mesh or otherwise configured to allow air to pass through the belt. In some embodiments, a belt dryer comprises at least two food grade conveyors stacked over one another. The length, or run, of the conveyor belts and their rates of transporting noodles are such that noodles are sufficiently dehydrated by the end of the process. The product enters on the top conveyor and proceeds slowly down the conveyor with the substantially singularized noodles subjected to a heated environment or a heating element. In some embodiments, the belt dryer is incubated at about 110° F., 120° F., 125° F., 130° F., 135° F., 140° F., or 145° F. or higher. In some embodiments, the belt dryer comprises a heating element that allows heating of the noodles to a temperature sufficient to aid in dehydration (e.g., 110° F., 120° F., 125° F., 130° F., 135° F., 140° F., or 145° F. or higher). At the end of the run, the noodles are deposited gently on a lower conveyor. This process is repeated 3-5 times or any number of times. In some embodiments, the dehydration process takes about 30 minutes, about 45 minutes, about 60 minutes, about 75 minutes, about 90 minutes, about 105 minutes, about 120 minutes, about 135 minutes, about 150 minutes, about 165 minutes, or about 180 minutes or more.

In some embodiments, the dehydrated noodles are incubated at a temperature sufficient to kill pathogens or microbial contaminants such as mold spores and yeast (Step 6, FIG. 1). In some embodiments, the dehydrated noodles are incubated at a temperature between about 110° F. and about 165° F. In some embodiments, the dehydrated noodles are incubated between about 110° F. and about 120° F., between about 120° F. and about 130° F., between about 130° F. and about 140° F., between about 140° F. and about 150° F., between about 150° F. and about 160° F., or between about 160° F. and about 165° F. or higher. For example, the dehydrated noodles are incubated at about 110° F., 115° F., 120° F., 130° F., 135° F., 140° F., 145° F., 150° F., 155° F., 160° F., 165° F. or higher.

In some embodiments, the noodles are dehydrated by lyophilization. In some embodiments, the noodles are dehydrated by lyophilization in a high vacuum. When lyophilizing noodles, the moisture in the cells of the vegetable is forced out using a combination of temperature, pressure, and time. In other embodiments, noodles are dried on trays in a drying room, similar to a process used to dry traditional grain-based extruded noodles. In some embodiments, after drying, the noodles are tumbled to singularize the noodles.

In some embodiments, the noodles are dehydrated by microwave freeze drying. In some embodiments, the method uses a microwave freeze dryer. Microwave freeze dryer is a conventional freeze dryer using microwaves in a drying chamber. Compared to a conventional freeze drying system which dries starting from the outside layer, the microwave system generates heat inside the vegetable noodles, so that freeze-drying occurs throughout the vegetable noodles. Sublimation occurs throughout the complete volume of the vegetable noodles. Microwave freeze drying is much more efficient and faster than conventional freeze drying. Microwave freeze drying s a rapid method that can yield products with improved stability compared to air-dried and freeze-dried products. The microwave radiation (within a frequency band of 300 MHz to 300 GHz) is provided in an amount sufficient to heat and dry the vegetable noodles. Because the drying is done under reduced pressure, the boiling point of water and the oxygen content of the atmosphere are lower, so vegetable sensitive to oxidation and thermal degradation can be retained to a higher degree than by air-drying. The dehydration process removes of the majority of moisture content in the noodles. In some embodiments, the noodles are substantially dry. Dehydrating the noodles results in noodles with less than 15% moisture, less than 14% moisture, less than 13% moisture, less than 12% moisture, less than 11% moisture, less than 10% moisture, less than 9% moisture, less than 8% moisture, less than 7% moisture, less than 6% moisture, less than 5% moisture, less than 4% moisture, less than 3% moisture, less than 2% moisture, or even less than 1% moisture. For example, a dehydrated noodle may have only 10%, 9%, 8%, 7%, 6%, 5%, 4%, 3%, 2%, 1%, or even less moisture (or water) content by weight. Moisture content has an inverse relationship with shelf life. For example, noodles that have less moisture will have a longer stable shelf life than noodles with more moisture. Additionally, noodles with low moisture content (e.g., 4%) will have insufficient moisture to support microbial growth.

In some embodiments of the present disclosure, the noodles are singularized, whereby noodles are substantially separated from other noodles. "Substantially separated" as used here means that at least between about 70% to about 80%, about 80% to 90%, between about 90% to 95%, or even about 95% to about 100% of the noodles are physically separated from other noodles. Singularization can be accomplished by any method known in the art. In some embodiments, singularization occurs during the dehydration process. For example, belt drying with stack multiple conveyors gently tumble the noodles as they dry. Singular noodles enable the producer to efficiently package the noodles and the consumer to remove as few or as many from the package to cook as they may like. Belt drying also will spread out any piles or clumps of noodles ("bird nests") that occur during the cutting process.

In some embodiments, the method comprises packing the noodles as a brick of noodles, cakes of noodles or a puck of noodles. In some embodiments, the vegetable noodles are dried in retaining rings. In some embodiments, the vegetable noodles are placed in a drying container having a mesh like bottom. In some embodiments, the container can be circular, square, or rectangle in shape. In some embodiments, the container has the shape of a cup. In some embodiments, the drying containers can be placed on a drying tray and carried through a conveyor system exposing the noodles to an air current or heat or both.

Dehydrated noodles can be rehydrated by adding fluid (e.g., water, broth, and the like). In some embodiments, the vegetable noodles are heated prior to consumption. Carrots are unique in that they have a cuticle cell wall and take longer to cook to produce the desired softness. In some embodiments, a noodle dish can be prepared by adding boiling water and/or salt. In some embodiments, a pad of butter is added to the noodles.

In some embodiments, the whole vegetable, the cut vegetable or the dehydrated noodles can be treated by irradiation. In some embodiments, the vegetable can be subjected to gamma radiation, X-rays, electron beam or a combination thereof.

In some embodiments, the shelf life of the vegetable noodles can be assessed. In some embodiments, the assessment comprises accelerated shelf life evaluation. For accelerated shelf life evaluation, the analyses can be performed on products held at high temperatures: ~32.0° C. (89.6° F.)±2°. In some embodiments, the level of bacterial contamination on the surfaces of vegetables may be measured by any of the well-known techniques used in the art. For example, the aerobic plate count (APC) may be determined according to AOAC 966.23. The total coliform count (TCC) may be determined according to AOAC 991.14. The *E. coli* count may be determined according to AOAC 991.14. The *Listeria monocytogenes* count may be determined according to AOAC 2003.07. The *Salmonella* count may be determined according to AOAC 061302. The *Staphylococcus* count may be determined according to AOAC 051303. Yeast and mold counts can be assessed using assays from U. S. Food and Drug Administration Bacteriological Analytical Manual (FDA BAM) Chapter 18, Yeasts, Molds and Mycotoxins (https://www.fda.gov/food/laboratory-methods-food/bam-chapter-18-yeasts-molds-and-mycotoxins).

In some embodiments, the recommended results at the end of the accelerated shelf life are as follow.

Aerobic plate count (CFU/g): less than 1000,000/g as assessed using AOAC 966.23

Total coliform (CFU/g): less than 10/g as assessed using AOAC 991.14

*E. Coli* (CFU/g): less than 10/g as assessed using AOAC 998.08

Yeast (CFU/g): less than 1000/g as assessed using BAM Ch. 18

*Staphylococcus* (CFU/g): less than 10/g as assessed using AOAC 051303/PCR

*Salmonella* (/25 g): Negative as assessed using AOAC 061302/PCR

*Listeria monocytogenes* (/25 g): Negative as assessed using AOAC 2003.07

Mold (CFU/g) (CFU/g): less than 1000/g as assessed using BAM Ch. 18

Packaging and Kits

Some aspects of the present disclosure provide kits for cooking dehydrated vegetable noodles. In some embodiments, the kit includes the vegetable noodle and one or more ingredients to be used in rehydrating and cooking the noodles. In some embodiments, the one or more ingredients comprise a flavoring agent, proteins or combinations thereof. For example, the kit may include a package or container of noodles and a package of flavoring agents (e.g., spices, salts, and the like). In some embodiments, the flavoring agent is a dehydrated broth or sauce. In some embodiments, the flavoring agent can be, but is not limited to, an instant chicken base, instant beef base, instant fish base, instant vegetable base, instant vegetarian chicken base, instant vegetarian meat base, coconut milk powder, tomato powder or similar bases. In some embodiments, the kits include a soup blend. The soup blend can be a dried vegetable soup mix (including for example, carrots, onion, tomato, celery, diced red pepper, mushroom, etc.), an herb mix (including for example, garlic, celery seed, basil, oregano, marjoram, mustard seed, etc.), and/or sea salt. In some embodiments, dried vegetable soup mix can include broccoli stalks. In some embodiments, the one or more ingredients comprise proteins, for example, but not limited to pea proteins.

The kit maybe sold with packaging that contains all of the kit components. The kit packaging may be a container in which the noodles and/or kit components can be cooked in. In some embodiment, the kit is single serving or multiple serving. For example, the container can be a bowl, a cup or the like. In some embodiments, the container is configured such that sufficient space is available for the addition of water and the expansion of the noodles as water is absorbed. In some embodiments, the kit includes instructions for storing, handling, rehydrating, preparing or cooking the noodles, or any combination thereof. Selected ingredients may be separately packaged as a flavor packet to be added to the noodles just before use. In some embodiment, upon the addition of water, the container can be microwaved.

In some embodiments, the packaging substantially protect its content from contact with oxygen, light and/or humidity. In some embodiments, the packaging is a modified atmosphere packaging so that the amount of oxygen inside the package is decreased. In some embodiments, oxygen is replaced with a harmless gas, such as nitrogen, or a mixture of gas. In some embodiments, the packaging decreases permeability to moisture and oxygen. In some embodiments, the packaging contains an oxygen scavenger and/or desiccant pack. In some embodiments, the modified atmosphere packaging extends the shelf-life of the noodles.

The following examples are put forth so as to provide those of ordinary skill in the art with a complete disclosure and description of how to make and use dehydrated vegetable noodles of the presently disclosed embodiments, and are not intended to limit the scope of what the inventors regard as their presently disclosed embodiments.

EXAMPLES

Example 1: Food Safe Zucchini Noodles

Vegetable noodles are generally prepared in a manner suitable for consumption and not for storage. Because the noodles are consumed shortly after production and because the noodles are generally cooked at a temperature sufficient to kill microorganisms, antimicrobial steps are not included in production of the noodles.

Vegetable noodles were prepared from zucchini. To determine if antimicrobial steps could be included in processing zucchini without negatively impacting the quality of the noodle (e.g., texture, taste, and subsequent rehydration and cooking time), uncut zucchinis were first incubated with a 175 to 200 ppm chlorine solution (SaniDate) for two minutes. The level of the solution was monitored and recorded to ensure that sufficient concentration of antimicrobial solution was present during the wash. The zucchinis were then cooled to about 36° F. to about 38° F.

Figure 2A:
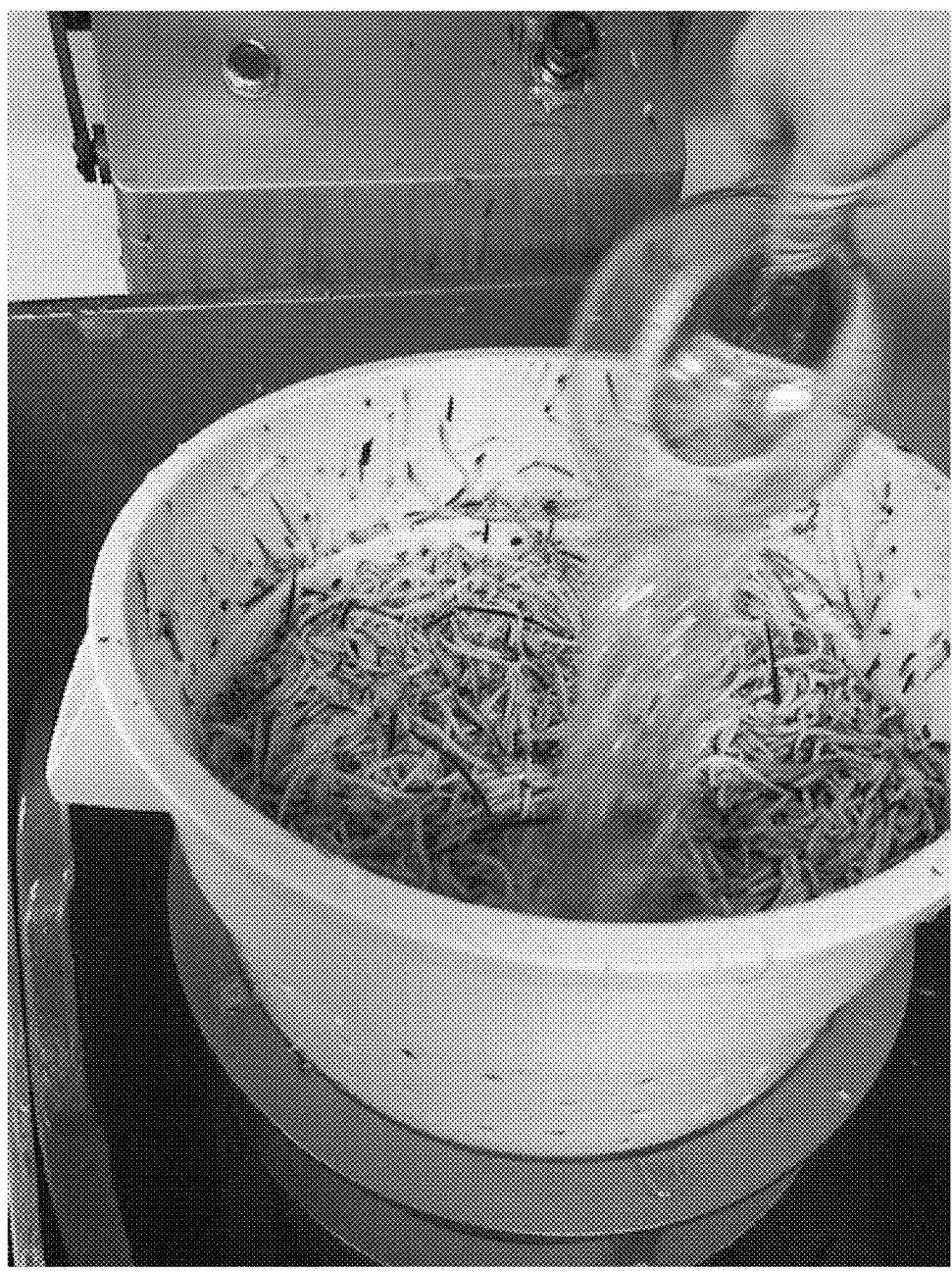
FIG. 2A is an image of peeled zucchini noodles being treated with an antimicrobial agent, according to some embodiments.

The zucchinis were then cut into noodles using a noodle maker. The noodles were placed in a centrifuge and saturated with 200 ppm of SaniDate 15 (Biosafe Systems LLC, Hartford, Conn.) to decrease or eliminate microbial contaminants (FIG. 2A). The SaniDate 15 solution was drained, thereby removing the cleaning solution and the excreted fluid from damaged cells that cause the noodles to have an adhesive surface. The noodles were spun at 800 rpm for 2 minutes at between about 36° F. and 38° F., removing excess fluids and remaining SaniDate and excreted cellular fluid. Centrifuging dewatered the noodles and removed materials that bled from the cells damaged when the vegetables were cut, thereby making the noodles less adhesive and more readily singularized.

Figure 2B:
FIG. 2B is an image of dehydrated zucchini noodles, according to some embodiments.

The noodles were then dehydrated. Specifically, the noodles were incubated at 125° F. for 2 hours on a multilevel conveyor belt assembly. Dehydration resulted in water activity being below 4% moisture, ensuring that there is not sufficient "free water" for pathogen cell division (i.e., reproduction) (FIG. 2B). Moisture content of 8.5% or lower is the industry standard. Additionally, 125° F. exceeds the temperature (118° F.) required to kill *Listeria* species, a common microbial contaminant of harvested vegetables. The noodles are additionally incubated at 145° F. for 10 minutes to kill mold, yeast, and all other microbial pathogens. Lab tests were performed to confirm that the noodles, subjected to multiple antimicrobial steps, met food safety requirements.

Example 2: Sweet Potato Noodles

Vegetable noodles were prepared from sweet potato. Uncut vegetables were sanitized using the procedure disclosed in Example 1. The vegetables were peeled using stainless steel knives. The knives, seed scopes, cutting boards, totes, centrifuges, and noodle makers were tested for the presence of surface adenosine triphosphate (ATP), a marker for microbial growth, using commercially available ATP and swab tests. These tests detect the presence of growing microorganisms and were performed to ensure no microbial contamination was introduced during processing of the vegetables.

Figure 3:
FIG. 3 is an image of dehydrated sweet potato noodles, according to some embodiments.

The vegetables were then cut into noodles using a noodle maker. The noodles were dehydrated and subjected to additional heat treatment to eliminate microbial contamination (FIG. 3) using the procedures disclosed in Example 1.

Example 3: Butternut Squash Noodles

Vegetable noodles were prepared from butternut squash. Uncut vegetables were sanitized and peeled using the methods disclosed in Example 1. The vegetables were peeled using stainless steel knives. The knives, seed scopes, cutting boards, totes, centrifuges, and noodle makers were tested for microbial contamination using the commercially available ATP and swab tests described in Example 2.

Figure 4A:
FIG. 4A is an image of dehydrated butternut squash noodles, according to some embodiments.

The vegetables were cut into spaghetti-shaped noodles using a noodle maker and dehydrated (FIG. 4A) using the procedures disclosed in Example 1. The dehydrated noodles were sufficiently singularized, such that aggregation of the noodles into clumps was not observed. The water content of the dehydrated noodles was less than 8.5%.

Figure 4B:
FIG. 4B is an image of partially rehydrated butternut squash noodles, according to some embodiments.
Figure 4C:
FIG. 4C is an image of heated, rehydrated butternut squash noodles, according to some embodiments.

The noodles were rehydrated in water (FIG. 4B and FIG. 4C) and heated in a microwave for about 5 minutes. These reconstituted noodles have a texture similar to that of cooked grain-based noodles. The length of cooking time can be varied to adjust the texture to that desired by the consumer. For example, less cooking time results in an al dente noodle. The noodles were allowed to cool, resulting in butternut squash spaghetti noodles.

Example 4: Butternut Squash Noodle Meal

Vegetable noodles were prepared from butternut squash using the procedure described in Example 3. Uncut vegetables were sanitized and peeled using the methods described in Example 1. The vegetables were peeled using stainless steel knives. The knives, seed scopes, cutting boards, totes, centrifuges, and noodle makers were tested for microbial contamination using the commercially available ATP and swab tests described in Example 2.

Figure 5A:
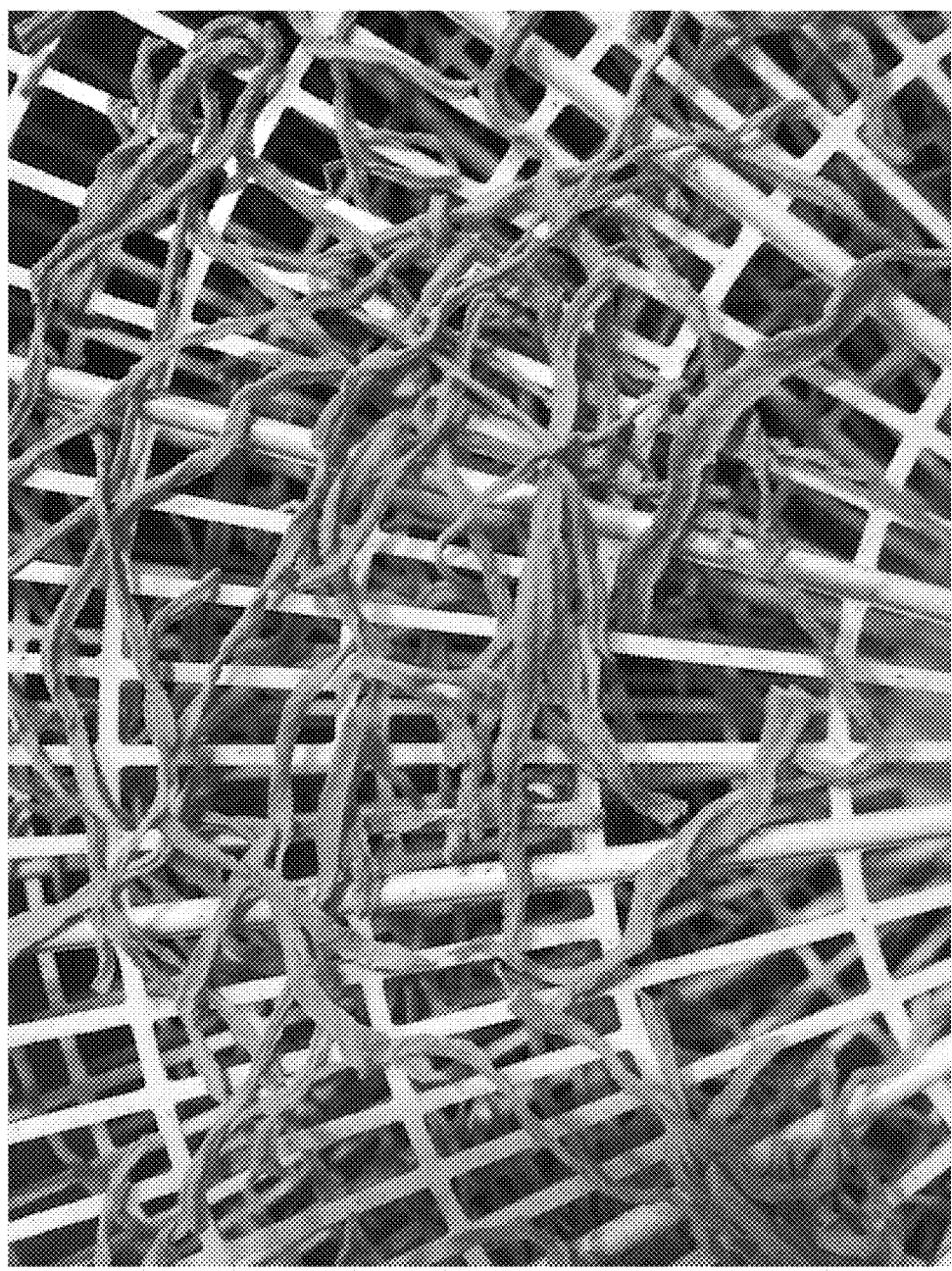
FIG. 5A is an image of dehydrated butternut squash noodles, according to some embodiments.

The vegetables were cut into spaghetti-shaped noodles using a noodle maker and dehydrated (FIG. 5A) using the procedures disclosed in Example 1. The dehydrated noodles were sufficiently singularized, such that aggregation of the noodles into clumps was not observed (FIG. 5G). The water content of the dehydrated noodles was less than 8.5%.

Figure 5B:
FIG. 5B is an image of dehydrated butternut squash noodles and a mix of dehydrated herbs, spices, and vegetables, according to some embodiments.
Figure 5C:
FIG. 5C is an image of rehydrating the dehydrated butternut squash noodles and mixed dehydrated herbs, spices, and vegetables shown in FIG. 5B, according to some embodiments.
Figure 5D:
FIG. 5D is an image of rehydrated butternut squash noodles and mixed herbs, spices, and vegetables shown in FIG. 5B, according to some embodiments.
Figure 5E:
FIG. 5E is an image of the rehydrated butternut squash noodles and mixed herbs, spices, and vegetables shown in FIG. 5B after heating the noodles, according to some embodiments.
Figure 5F:
FIG. 5F is an image of a prepared meal comprising rehydrated butternut squash noodles and mixed herbs, spices, and vegetables, according to some embodiments.
Figure 5G:
FIG. 5G is an image of dehydrated butternut squash noodles, according to some embodiments.

The dehydrated vegetable noodles were combined with dehydrated herbs and spices and rehydrated (FIGS. 5B-5D). The rehydrated noodles were then heated in a microwave for about 5 minutes. The noodles were allowed to cool (FIG. 5E), resulting in a finished butternut squash noodle meal (FIG. 5F).

Example 5: Carrot Noodles

Carrot noodles were prepared. Uncut carrots were sanitized and peeled using the methods described in Example 1. The carrots were peeled using stainless steel knives. The knives, seed scopes, cutting boards, totes, centrifuges, and noodle makers were tested for microbial contamination using the commercially available ATP and swab tests described in Example 2.

Figure 6A:
FIG. 6A is an image of dehydrated carrot noodles, according to some embodiments.
Figure 6B:
FIG. 6B is an image of rehydrated carrot noodles, according to some embodiments.
Figure 6C:
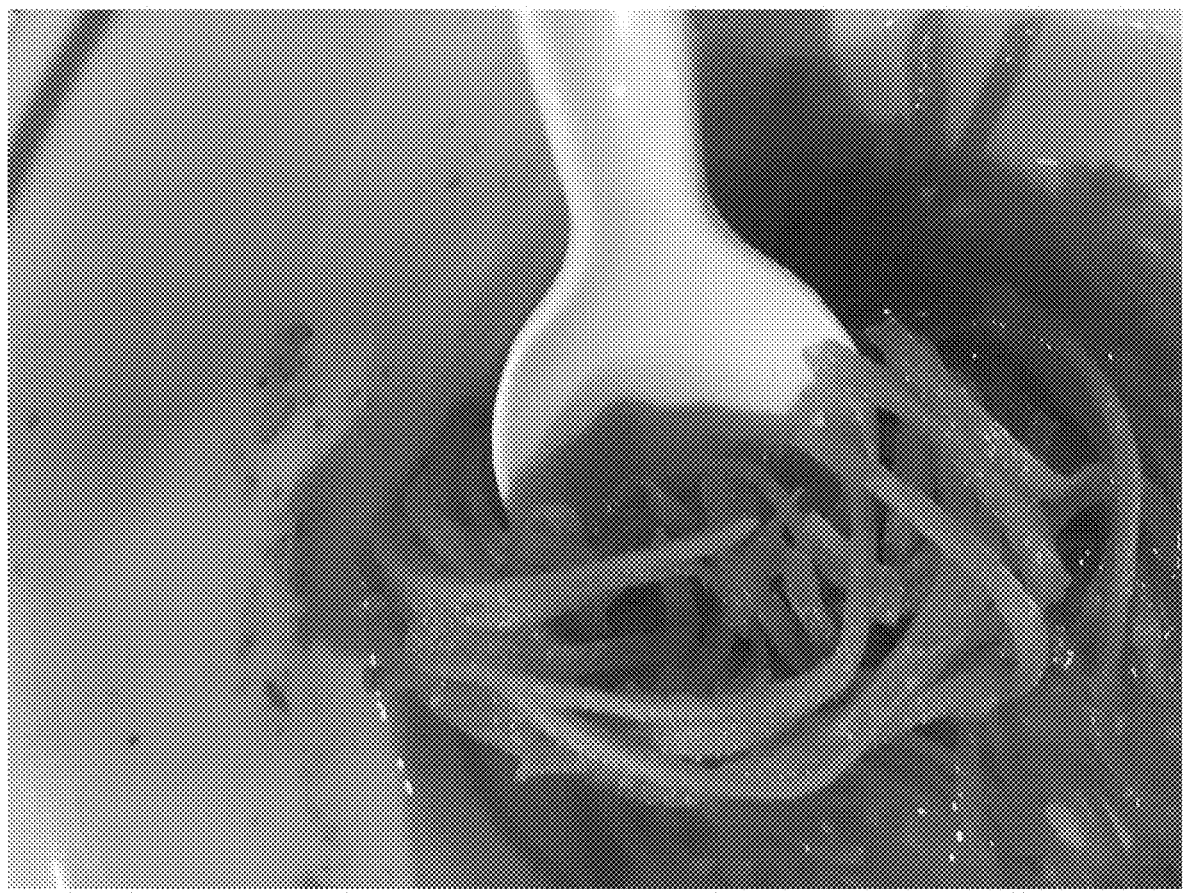
FIG. 6C is an image of rehydrated carrot noodles in liquid, according to some embodiments.

The carrots were cut into spaghetti-shaped noodles using a noodle maker and dehydrated (FIG. 6A) using the method described in Example 1. The dehydrated noodles were sufficiently singularized, such that aggregation of the noodles into clumps was not observed. The water content of the dehydrated noodles was less than 8.5%. The carrot noodles were rehydrated in water and heated (FIG. 6B). Specifically, the dehydrated noodles were placed in a bowl or pot and water and a dash of salt was added (FIG. 6C). This was heated in a microwave for approximately 7 minutes. Alternatively, the pot or bowl of noodles can be brought to a slow boil for 7 minutes and then allowed to cool and drain.

Example 6: Broccoli Noodles

Broccoli noodles were prepared. Uncut broccoli were sanitized and peeled using the methods described in Example 1. The stems of the broccoli were peeled using stainless steel knives. The knives, seed scopes, cutting boards, totes, centrifuges, and noodle makers were tested for microbial contamination using the commercially available ATP and swab tests described in Example 2.

Figure 7A:
FIG. 7A is an image of dehydrated broccoli noodles, according to some embodiments.
Figure 7B:
FIG. 7B is an image of rehydrated broccoli noodles, according to some embodiments.

The broccoli were cut into spaghetti-shaped noodles using a noodle maker and dehydrated (FIG. 7A) using the method described in Example 1. The dehydrated noodles were sufficiently singularized, such that aggregation of the noodles into clumps was not observed. The water content of the dehydrated noodles was less than 8.5%. The broccoli noodles were rehydrated in water (FIG. 7B).

Example 7: Pink Radish Noodles

Pink radish noodles were prepared. Uncut pink radishes were sanitized and peeled using the methods described in Example 1. The pink radishes were peeled using stainless steel knives. The knives, seed scopes, cutting boards, totes, centrifuges, and noodle makers were tested for microbial contamination using the commercially available ATP and swab tests described in Example 2.

Figure 8A:
FIG. 8A is an image of dehydrated pink radish noodles, according to some embodiments.
Figure 8B:
FIG. 8B is an image of rehydrated pink radish noodles, according to some embodiments.

The pink radishes were cut into spaghetti-shaped noodles using a noodle maker and dehydrated (FIG. 8A) using the method described in Example 1. The dehydrated noodles were sufficiently singularized, such that aggregation of the noodles into clumps was not observed. The water content of the dehydrated noodles was less than 8.5%. The pink radish noodles were rehydrated in water (FIG. 8B).

Example 8: Golden Beet Noodles

Golden beet noodles were prepared. Uncut golden beets were sanitized and peeled using the methods described in Example 1. The golden beets were peeled using stainless steel knives. The knives, seed scopes, cutting boards, totes, centrifuges, and noodle makers were tested for microbial contamination using the commercially available ATP and swab tests described in Example 2.

Figure 9A:
FIG. 9A is an image of dehydrated golden beet noodles, according to some embodiments.
Figure 9B:
FIG. 9B is an image of rehydrated golden beet noodles, according to some embodiments.

The golden beets were cut into spaghetti-shaped noodles using a noodle maker and dehydrated (FIG. 9A) using the method described in Example 1. The dehydrated noodles were sufficiently singularized, such that aggregation of the noodles into clumps was not observed. The water content of the dehydrated noodles was less than 8.5%. The golden beet noodles were rehydrated in water (FIG. 9B).

Example 9: Bullseye Beet Noodles

Bullseye beet noodles were prepared. Uncut bullseye beets were sanitized and peeled using the methods described in Example 1. The bullseye beets were peeled using stainless steel knives. The knives, seed scopes, cutting boards, totes, centrifuges, and noodle makers were tested for microbial contamination using the commercially available ATP and swab tests described in Example 2.

Figure 10A:
FIG. 10A is an image of dehydrated bullseye beet noodles, according to some embodiments.
Figure 10B:
FIG. 10B is an image of rehydrated bullseye beet noodles, according to some embodiments.

The bullseye beets were cut into spaghetti-shaped noodles using a noodle maker and dehydrated (FIG. 10A) using the method described in Example 1. The dehydrated noodles were sufficiently singularized, such that aggregation of the noodles into clumps was not observed. The water content of the dehydrated noodles was less than 8.5%. The bullseye beet noodles were rehydrated in water (FIG. 10B).

Example 10: Turnip Noodles

Turnip noodles were prepared. Uncut turnips were sanitized and peeled using the methods described in Example 1. The turnips were peeled using stainless steel knives. The knives, seed scopes, cutting boards, totes, centrifuges, and noodle makers were tested for microbial contamination using the commercially available ATP and swab tests described in Example 2.

Figure 11A:
FIG. 11A is an image of dehydrated turnip noodles, according to some embodiments.
Figure 11B:
FIG. 11B is an image of rehydrated turnip noodles, according to some embodiments.

The turnips were cut into spaghetti-shaped noodles using a noodle maker and dehydrated (FIG. 11A) using the method described in Example 1. The dehydrated noodles were sufficiently singularized, such that aggregation of the noodles into clumps was not observed. The water content of the dehydrated noodles was less than 8.5%. The turnip noodles were rehydrated in water (FIG. 11B).

Other Embodiments

From the foregoing description, it will be apparent that variations and modifications may be made to the presently disclosed embodiments described herein to adopt it to various usages and conditions. Such embodiments are also within the scope of the following claims.

The recitation of a listing of elements in any definition of a variable herein includes definitions of that variable as any single element or combination (or subcombination) of listed elements. The recitation of an embodiment herein includes that embodiment as any single embodiment or in combination with any other embodiments or portions thereof.

All patents and publications mentioned in this specification are herein incorporated by reference to the same extent as if each independent patent and publication was specifically and individually indicated to be incorporated by reference.

What is claimed is:

1. A method of making a dehydrated vegetable noodle, the method consisting of:
    contacting a vegetable with a solution comprising a first antimicrobial agent, wherein the antimicrobial agent comprises hypochlorite solution, ozone, hydrogen peroxide, peroxyacetic acid or combination thereof;
    cutting the vegetable to form noodle shaped vegetable material;
    contacting the vegetable with a second antimicrobial agent, wherein the first antimicrobial agent and the second antimicrobial agent are different;
    spinning the noodle shaped vegetable material, wherein the spinning removes excess liquid and moisture from the noodle shaped vegetable material, thereby forming a vegetable noodle;
    performing a first heat step comprising heating the vegetable noodle at a first temperature sufficient to remove at least 86% of moisture from the noodle, wherein the first temperature is between about 110° F. and about 130° F.;
    performing a second heat step comprising heating the vegetable noodle at a second temperature sufficient to kill a microorganism, wherein the second temperature is between about 130° F. and about 160° F.; and
    singularizing the noodles, providing a shelf stable, dehydrated vegetable noodle having a shelf life of at least 6 months.

2. The method of claim 1, wherein the second antimicrobial agent comprises hypochlorite solution, ozone, hydrogen peroxide, peroxyacetic acid or combination thereof.

3. The method of claim 1, wherein the concentration of the first antimicrobial agent in the solution is between about 100 ppm and about 600 ppm.

4. The method of claim 1, wherein the spinning is at about 400 rpm to about 1200 rpm.

5. The method of claim 1, wherein the vegetable is zucchini, potato, sweet potato, spaghetti squash, summer squash, winter squash, butternut squash, parsnip, turnip, rutabaga, cucumber, carrot, bullseye beet, golden beet, red beet celeriac, kohlrabi, pumpkin, daikon, eggplant, radish, breadfruit, apple, durian, jack-fruit, mango, melon, papaya, pineapple or combination thereof.

6. The method of claim 1, wherein the microorganism is a gram positive bacteria, a gram negative bacteria, mold, or yeast.

7. The method of claim 1, wherein the concentration of the first antimicrobial agent in the solution is less than 600 ppm.

* * * * *